United States Patent [19]

Taylor et al.

[11] Patent Number: 4,777,395
[45] Date of Patent: Oct. 11, 1988

[54] COMMUTATOR END BRACKET

[75] Inventors: William H. Taylor, Kent; Robert L. Hyatt, Tallmadge, both of Ohio

[73] Assignee: Ametek, Inc., Kent, Ohio

[21] Appl. No.: 846,019

[22] Filed: Mar. 31, 1986

[51] Int. Cl.⁴ .............................................. H02K 5/16
[52] U.S. Cl. ...................................... 310/90; 310/89; 310/239; 384/209
[58] Field of Search ................. 310/90, 233, 89, 91, 310/241, 234, 242, 42, 240, 244, 245, 246, 247, 248; 384/203, 204, 207, 208, 209, 214

[56] References Cited

U.S. PATENT DOCUMENTS

| | | | |
|---|---|---|---|
| 2,938,755 | 5/1960 | Lee | 384/204 |
| 3,026,432 | 3/1962 | Baumhart | 310/239 |
| 3,450,907 | 6/1969 | Blume | 310/89 |
| 3,875,436 | 4/1975 | MacFarland | 310/89 |
| 3,900,234 | 8/1975 | Roddy | 310/90 |
| 4,219,245 | 8/1980 | Lewis | 384/204 |
| 4,550,268 | 10/1985 | Becker | 310/239 |
| 4,621,991 | 11/1986 | Smith | 310/239 |

FOREIGN PATENT DOCUMENTS

| | | | |
|---|---|---|---|
| 1613207 | 6/1970 | Fed. Rep. of Germany | 310/239 |
| 2803262 | 8/1979 | Fed. Rep. of Germany | 310/90 |
| 0089043 | 5/1983 | Japan | 310/90 |
| 0020744 | 2/1985 | Japan | 310/89 |

Primary Examiner—R. Skudy
Attorney, Agent, or Firm—Renner, Kenner, Greive, Bobak, Taylor & Weber

[57] ABSTRACT

A commutator end bracket formed from a singular piece of sheet metal. The bracket is formed to include bases for mounting the commutator end bracket to a motor. Windows are punched into side pieces of the bracket for receiving brushes for communication with a commutator. The brushes are retained by a clip received within channels formed along the edges of the side pieces. A bearing is received within a housing drawn from a top plate of the bracket. The bearing is maintained within the housing by means of a spring clip which mates with portions of the top plate.

20 Claims, 3 Drawing Sheets

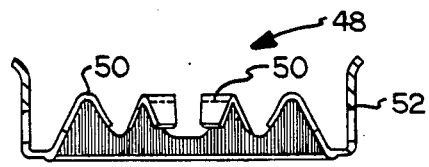
FIG. 6A
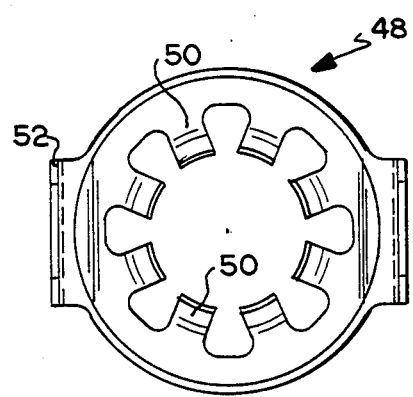 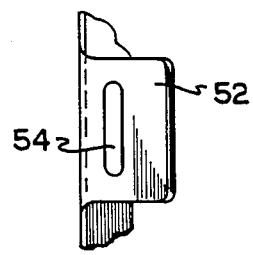
FIG. 6B  FIG. 6C

4,777,395

COMMUTATOR END BRACKET

TECHNICAL FIELD

The invention herein resides in the art of electric motors and, more particularly, to commutator end brackets for such motors.

BACKGROUND ART

Numerous types of electric motors have previously been known. Virtually all such motors include a commutator end bracket for receiving an end of the motor shaft and for receiving and maintaining carbon brushes in communication with the commutator. Known commutator end brackets are typically of cast aluminum or other metal, or are molded of a suitable plastic material. Such casting and molding is both expensive and time consuming, principally as a result of the nature of the materials and equipment used in forming the brackets.

While some commutator end brackets have previously been formed by a stamping process, none have included preformed brush retention means or a bearing housing adapted for receiving various types of bearings and having retaining means therefor.

DISCLOSURE OF INVENTION

In light of the foregoing, it is a first aspect of the invention to provide a commutator end bracket which is given to formation by a stamping operation.

Another aspect of the invention is the provision of a commutator end bracket constructed from a sheet of metal and defined by bends, folds, and punched holes.

Yet an additional aspect of the invention is the provision of a commutator end bracket wherein a retainer clip is provided for receiving and maintaining a bearing which in turn receives an end of the motor shaft.

Still another aspect of the invention is the provision of a commutator end bracket wherein the commutator brushes are quickly and easily placed and retained by means of a clip received within a flange.

Still a further aspect of the invention is the provision of a commutator end bracket wherein a bearing housing capable of receiving and maintaining various bearings is provided.

The foregoing and other aspects of the invention which will become apparent as the detailed description proceeds are achieved by a commutator end bracket for use in an electric motor, comprising: a top portion; a side portion extending from each of two opposite ends of said top portion and substantially normal thereto; and a mounting base extending from an end of each said side portion, said mounting bases being substantially parallel to said top portion.

Still other aspects of the invenion are attained by a commutator end bracket for an electric motor, comprising: a pair of side plates; a top plate interconnecting said side plates at first ends of said side plates; a housing extending from said top plate for receiving a bearing therein; and retaining means secured to said top plate and engaging said bearing for urging said bearing to an end of said housing.

DESCRIPTION OF DRAWINGS

For a complete understanding of the objects, techniques and structure of the invention reference should be had to the following detailed description and accompanying drawings wherein:

FIG. 6, comprising FIGS. 6A–6C, respectively present a partial sectional view, top plan view, and partial side elevational view of the bearing retaining clip of the invention.

BEST MODE FOR CARRYING OUT THE INVENTION

Figure 1:
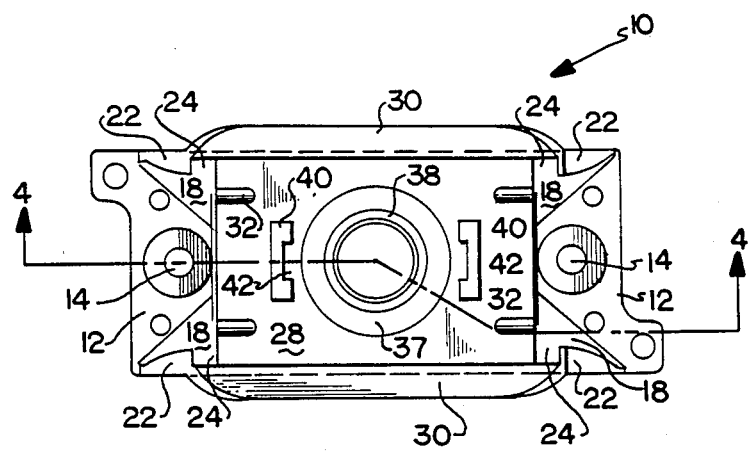
FIG. 1 is a top plan view of the commutator end bracket of the invention.
Figure 3:
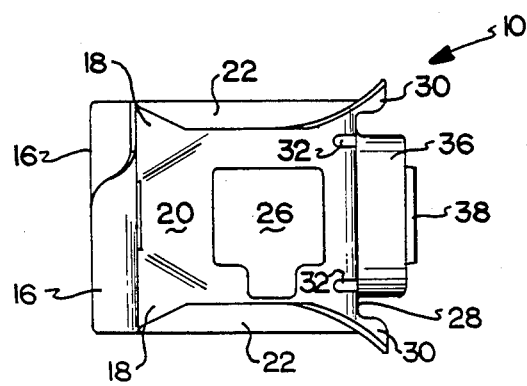
FIG. 3 is a side elevational view of the commutator end bracket of FIGS. 1 and 2.
Figure 2:
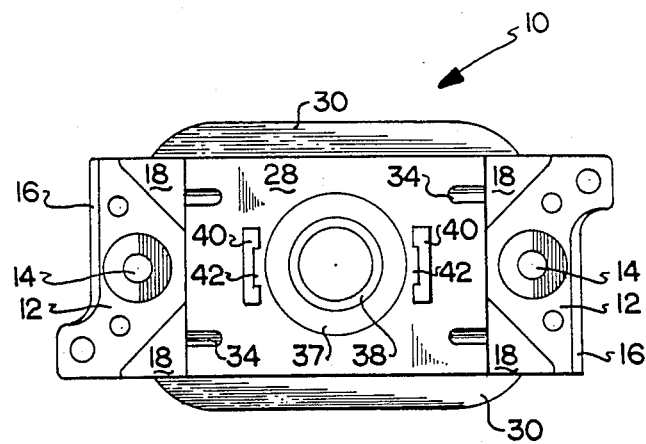
FIG. 2 is a bottom plan view of the structure of FIG. 1.

Referring now to the drawings and more particularly FIGS. 1–4, it can be seen that a commutator end bracket according to the invention to designated generally by the numeral 10. It will be appreciated from the discussion hereinafter that the end bracket 10 may be formed from a singular piece of sheet metal as by bending, punching, stamping, and forming, using the techniques which have heretofore been known in the metal stamping art. The particular end bracket 10 is conducive to such method of manufacture.

A mounting base or portion 12 is positioned on each end of the commutor end bracket 10 having holes 14 punched therethrough for allowing the end bracket 10 to be secured to a motor. A base edge flange 16 is formed substantially normal to the mounting base 12 and downwardly therefrom to define a lip for ease of positioning the commutator end bracket and for strengthening the assembly. Angled corner webs 18 are formed to interconnect between the mounting base 12 and the side pieces 20, which side pieces are substantially normal to the mounting base 12. The angled corner webs 18 allow for ease of forming the assembly while further strengthening the same.

Side flanges or portions 22 are formed from the side pieces 20 by rolling or bending the metal at the edges thereof inwardly to define channels 24 between the flanges 22 and the side pieces 20. Accordingly, there is presented a pair of channels 24 on either side of a window or opening 26 within the side piece 20 for receiving and maintaining a brush holder which allows a carbon brush to communicate inwardly of the end bracket 10 with a commutator maintained therewithin. It will be appreciated that brush holders 29 received within the windows 26 may be retained therein by means of a clip 27 received within the associated pair of channels 24 which slides down over the brush holder and serves as a collar retaining the brush holder in position. A suitable retaining clip or collar is shown in co-pending U.S. patent application Ser. No. 704,321, filed Feb. 22, 1985, now U.S. Pat. No. 4,621,991. Suffice it to say that the channels 24 receive the clips or collars in frictional engagement to retain the same therein such that they may, in turn, retain the brush holder assemblies.

A top plate or portion 28 comprises the top central portion of the commutator end bracket 10 and is so formed at its side edges as to be characterized by a flange 30 rolled outwardly on either side on either side thereof. It will be noted that the flange 30 comprises an extension of the side flanges 22 and is formed for purposes of adding strength and rigidity to the top plate 28.

Detents 32 are formed in the top surface of the sheet forming the bracket 10 at the point of bend from the top plate 28 to the perpendicular side pieces 20. The detents 32 provide for strain relief during the bending operation. As noted in FIG. 2, the detents 32 result in corresponding ribs 34 on the underside of the top plate 28.

A cylindrical housing or tower 36 is formed by a deep drawing action in the top plate 28 to a shoulder 37 and a reduced diameter neck 38. The cylindrical housing 36 is opened at the bottom thereof with a larger diameter opening in the bottom of the top plate 28, while the neck 38 is opened at the top thereof with a smaller diameter opening. As will be discussed hereinafter, the cylindrical housing 36 is adapted to receive a suitable bearing for maintaining the motor shaft. Also punched into the top plate 28 are a pair of slots 40 characterized by tabs or ears 42.

Figure 4:
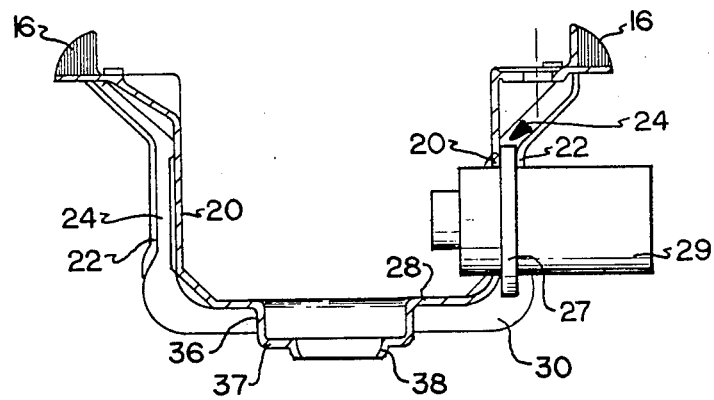
FIG. 4 is a sectional view of the commutator end bracket of FIG. 1 taken along the line 4—4.
Figure 5:
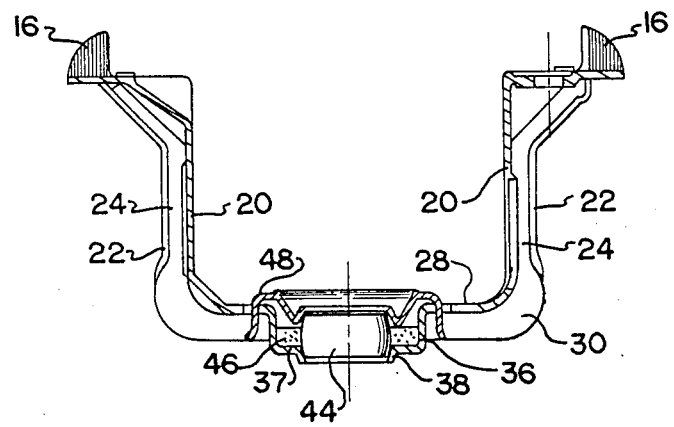
FIG. 5 is a partial sectional view of the commutator end bracket of FIG. 4 showing the placement of the shaft bearing therein.

With reference to FIG. 5, it can be seen that a sleeve bearing 44 is received by the opening of the neck 38 and maintained within the cavity of the housing 36. As shown in FIGS. 4 and 5, the inner surface of the neck 38 is curved or radiused to receive a similarly curved or radiused edge of the sleeve bearing 44, allowing the bearing to be selfaligning with a motor shaft received therein. A felt washer 46, impregnated with oil or other suitable lubricant, is maintained about the sleeve bearing 44 for purposes of imparting lubrication thereto. Finally, a retainer clip 48 of spring steel or other suitable material is engaged with the ears 42 of the slots 40 and brought into forceful engagement with the bearing 44 to center the sleeve bearing 44 at the neck 38 and to retain it at that position.

It is also contemplated that the housing or tower 36 may receive a ball bearing therewithin. In such a case, the ball bearing will have an outside diameter slightly less than the inside diameter of the housing 36 to accommodate a slip fit. Unlike the self-aligning sleeve bearing 44, the ball bearing substantially fills the housing 36, biased by a load spring maintained on the shoulder 37, and requires neither the felt washer 46 nor retainer clip 48.

As shown in FIGS. 6A–6C, the retainer clip 48 comprises an annular ring having spring fingers 50 angled inwardly toward the hole to the annular ring. A shown in the drawings, the spring fingers 50 angle downwardly then upwardly at the ends thereof, with the ends making contacting and urging engagement with the sleeve bearing 44. Prefereably, the retainer clip 48 is tempered after it is shaped and the fingers 50 are defined so as to provide the desired spring effect.

Two ears 52 are provided with the retainer clip 48, one on either side thereof. The ears 52 are each provided with a slot 54 which is slightly larger in size than the tabs 42 of the slots 40. The ears pass into the slots 40 and slide over the tabs 42 such that the slots 54 then spring into engagement with the tabs 42, thus securing the retainer clip 48 in engagement with the sleeve bearing 44.

It should be apparent that the commutator end bracket 10 of the invention may be readily formed form a piece of sheet material such as steel by using commonly known metal working techniques. By bending, punching, stamping, drawing, and the like the entire structure of the bracket 10 may be formed. The bearing 44 may be introduced into the cylindrical housing 36, encircled by the lubricating felt washer 46, and secured by the retainer clip 48. Similarly, brush assemblies may be introduced into the windows or openings 26 and secured therein by clips received by the channels 24.

Thus it can be seen that the objects of the invention has been satisfied by the structure presented hereinabove. While in accordance with the patent statutes only the best mode and preferred embodiment of the invention has been presented and described in detail, it is to be understood that the invention is not limited thereto or thereby. Accordingly, for an appreciation of the true scope and breadth of the invention reference should be had to the following claims.

What is claimed is:

1. A commutator end bracket for use in an electric motor, comprising:
   a top portion;
   a side portion extending from each of two opposite ends of said top portion and substantially normal thereto;
   a mounting base extending from an end of each said side portion, said mounting bases being substantially parallel to said top portion;
   said top portion, side portions, and mounting bases comprising a unitary piece of metal; and
   wherein edges of each said side portion are rolled inwardly, forming a channel along each of a pair of opposite edges of said side portions.
   a housing extending from said top portion for receiving a bearing therein; retaining means secured to said top portion and engaging said bearing for urging said bearing to an end of said housing; and wherein said housing is cylindrical, formed from said top portion, having openings in each of two ends thereof, a first larger opening within said top portion through which said retaining means engages said bearing, and a second smaller opening having a periphery engaging said bearing.

2. The commutator end bracket according to claim 1, wherein each said side portion is characterized by an opening therein adapted for receipt of a brush holder.

3. The commutator end bracket according to claim 2, wherein said channels are adapted for receipt of clips for engaging a brush holder.

4. the commutator end bracket according to claim 1, wherein edges of said top portion are rolled outwardly and interconnect with said edges of said side portions.

5. The commutator end bracket according to claim 1, wherein said top portion includes a housing extending therefrom, said housing adapted to receive a bearing.

6. The commutator end bracket according to claim 5, wherein said housing is cylindrical, having a neck extending from one end thereof, said neck adapted for receiving said bearing in contacting engagement.

7. The commutator end bracket according to claim 6, which further includes a retainer clip in contacting engagement with said bearing and urging said bearing into said neck.

8. The commlutator end bracket according to claim 7, wherein said retainer clip includes a plurality of spring fingers 50 engaging said bearing.

9. The commutator end bracket according to claim 8, wherein said top portion is characterized by a pair of first slots respectively receiving a pair of ears extending from said retainer clip.

10. The commutator end bracket according to claim 9, wherein said ears each have a second slot adapted to be received by a tab extending into each of said pair of first slots.

11. The commutator end bracket according to claim 10, which further includes lubrication retaining means maintained about said bearing and between said retainer clip and said cylindrical housing.

12. A commutator end bracket for an electric motor, comprising:
 a pair of side plates;
 a top plate interconnecting said side plates at first ends of said side plates;
 a housing extending from said top plate for receiving a bearing therein;
 retaining means secured to said top plate and engaging said bearing for urging said bearing to an end of said housing; and
 wherein said housing is cylindrical, formed from said top plate, having openings in each of two ends thereof, a first larger opening within said top plate through which said retaining means engages said bearing, and a second smaller opening having a periphery engaging said bearing.

13. The commutator end bracket according to claim 12, wherein said retaining means comprise an annular clip having spring fingers extending radially inwardly from a circumference thereof.

14. The commutator end bracket according to claim 13, wherein said annular clip has slots therein for receiving tabs in said top plate.

15. The commutator end bracket according to claim 12, wherein each said side plate has an opening therein for receiving an brush.

16. The commutator end bracket according to claim 15, wherein a pair of opposite edges of each said side plate is folded inwardly to define a channel, said channels adapted to receive a clip for receiving the brush.

17. The commutator end bracket according to claim 12, which further includes base plates, one extending from each of said side plates, said side plates being orthogonal to both said top and base plates, all of said plates being formed of a unitary metal plate.

18. The commutator end bracket according to claim 12, wherein said housing has a shoulder at one end thereof.

19. The commutator end bracket according to claim 18, wherein said shoulder has a neck extending from an inner periphery thereof.

20. The commutator end bracket according to claim 19, wherein said neck has an arcuate inner surface

* * * * *